INVENTOR.
ULRICH E. G. NEITZEL

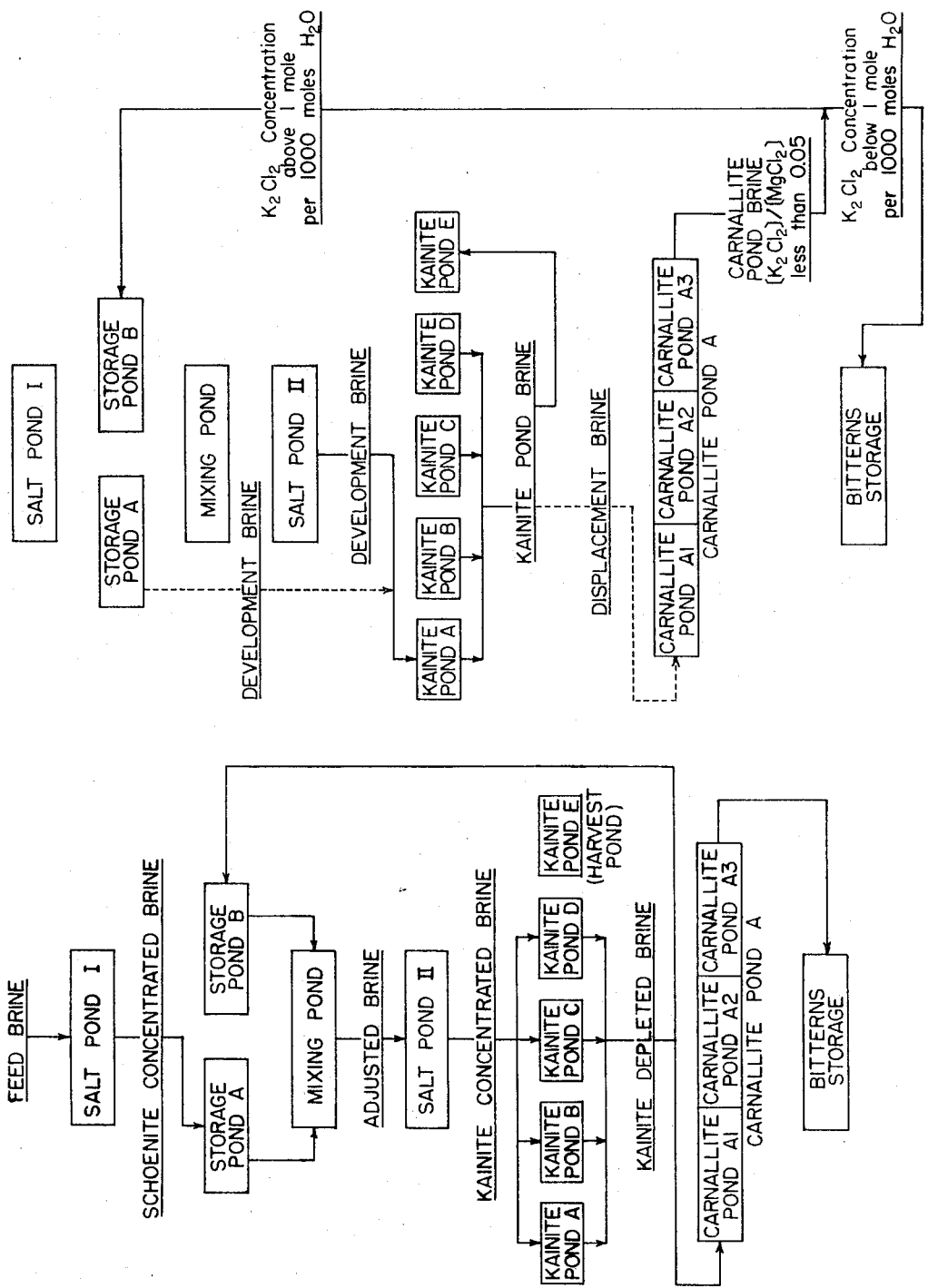

ATTORNEYS

United States Patent Office 3,592,615
Patented July 13, 1971

3,592,615
METHOD FOR PRODUCING POTASSIUM SALTS BY SOLAR EVAPORATION OF NATURAL BRINES
Ulrich E. G. Neitzel, Ogden, Utah, assignor to Great Salt Lake Minerals & Chemical Corporation, New York, N.Y.
Continuation-in-part of application Ser. No. 735,840, June 10, 1968. This application Aug. 28, 1968, Ser. No. 756,071
Int. Cl. B01d 9/00; C13k 1/10
U.S. Cl. 23—297
15 Claims

ABSTRACT OF THE DISCLOSURE

At the close of an evaporation season, the brines of a solar pond system that include salt ponds, kainite ponds, and carnallite ponds are manipulated to take advantage of the winter weather. The kainite crystal crops are enhanced in grade due to the influence of winter precipitation. Additional potassium-containing and sulfate-containing solids are recovered from the brines under the influence of winter temperatures. Brines produced during the non-evaporation season are stored for use during the next evaporation season, thereby increasing the annual productivity of the solar pond system.

RELATED APPLICATIONS

The present application is a continuation-in-part of the commonly assigned application for U.S. Pat. Ser. No. 735,840 filed June 10, 1968, entitled "Method for the Production of High-Grade Kainite."

The parent application discloses and claims a process whereby natural brines, such as those from the Great Salt Lake of Utah, are manipulated during the evaporation season to produce a high-grade kainite crystal crop in certain ponds designated "kainite pounds." Carnallite crystal crops may be produced in certain other ponds designated "carnallite ponds." The resulting carnallite-depleted brine is termed "bitterns brine" and is stored for use in the production of various magnesium chemicals. The brine manipulations taught by the parent application include a mixing step whereby brines saturated with respect to schoenite are admixed with recycled kainite-depleted brines to produce an adjusted brine. The adjusted brine composition is such that when it is evaporated the first potassium salt with which it becomes saturated is kainite. In this way, the production of a low-grade schoenite crystal product is avoided.

The present application discloses and claims a related process whereby the brines remaining in the ponds at the end of the evaporation season are manipulated to minimize winter losses of potassium salts and to enhance the grade of the crystal crop. The brine manipulations of this invention make it possible to increase the productivity of the solar pond system during the subsequent evaporation system by producing several brines suitable for use in the aforedescribed mixing procedure of the parent application.

BACKGROUND OF THE INVENTION

Field

This invention relates to the recovery of potassium values from brines. It is particularly directed to maximizing the yearly harvest of potassium salts from crystal crops resulting from the evaporation and manipulation of natural brines in a solar pond process. Specifically, the invention relates to the development and manipulation of brines in such a process during the winter season.

State of the art

It is known to evaporate natural brines to cause the precipitation of potassium-containing salts. Certain of these processes rely upon solar evaporation and are economical only if they result in a satisfactory quantity of crystal crop deposited per unit area. The economic success of such processes also depends upon the grade of the crystal crop which is ultimately harvested.

In most regions where solar evaporation is practiced, the year includes an evaporation season followed by a non-evaporation or winter season during which little, if any, evaporation occurs. During the winter season, precipitation accumulating in the solar ponds re-dissolves a substantial proportion of the crystal crop accumulated during the evaporation season. In the Great Salt Lake region of Utah, for example, winter precipitation typically redissolves at least 40 percent of the crystal product obtained during the evaporation season. Decanting accumulated precipitation from the evaporation ponds during the winter time is not feasible because of the large surface areas involved and the tendency of wind to mix the precipitation with the brine, more or less continuously.

It is known that brines saturated with potassium salts deposit potassium compounds when they are cooled. Moreover, various processes have been suggested which take advantage of natural fluctuations of temperature to cause the deposition of particular salts. There has, however, been developed no practical expedient for preventing the accumulation of winter precipitation in solar ponds. Thus, a portion of the crystal crop dropped during the evaporation season, as well as any additional crystal crop which drops due to winer cooling, is re-dissolved as the pond brine, diluted by accumulated winter precipitation, is warmed in the spring.

SUMMARY OF THE INVENTION

The present invention provides a procedure whereby the deleterious effect of winter precipitation is minimized. The procedure taught by this invention actually utilizes winter precipitation to upgrade the crystal crops before they are harvested. According to preferred embodiments, the brines of the system are manipulated during the winter to produce recycle brine for summer use. In this fashion, the amount of bitterns brine that may be produced during the evaporation season is increased.

At the end of the evaporation season, the ponds of a solar pond system operated in the manner disclosed and claimed by the parent application, Ser. No. 735,840, contain crystal crops of specific, predetermined composition covered by brines which are also of specific, predetermined composition. During the evaporation season, kainite-saturated brine is introduced to kainite ponds and kainite-depleted brine is withdrawn therefrom. At the close of the evaporation season, the kainite ponds contain a high-grade kainite crystal crop covered by a "kainite pond brine" with composition intermediate the composition of the kainite-saturated feed brine and the kainite-depleted effluent brine, respectively, i.e., brines substantially saturated with respect to potassium salts and containing between about 45 and about 65 moles $MgCl_2$ per 1,000 moles water. Similarly, during the evaporation season, carnallite-saturated brine is introduced to the carnallite ponds and carnallite-depleted brine is withdrawn therefrom so that, at the close of the evaporation season, the carnallite ponds contain a carnallite crystal crop covered by a "carnallite pond brine" intermediate in composition between the carnallite-saturated feed brine and the carnallite-depleted effluent brine. Such brines typically contain between about 60 and about 80 moles $MgCl_2$ per 1,000 moles water and are substantially saturated with respect to potassium salts. Ponds prior in the flow sequence of the solar pond system to the kainite ponds contain crystal crops of NaCl and hydrated magnesium sulfate but little, if any, potassium salts, covered by "development brines" which are sufficiently concentrated with respect to potassium salts that the solubility limit thereof will be exceeded as the brine is cooled during the winter season.

In the practice of this invention, at the close of the evaporation season at least some of the kainite ponds in a solar pond system are drained, thereby exposing the kainite crystal crops to winter precipitation (e.g. snow, sleet, rain, etc.). The brine from these ponds is stored in one or more other ponds, preferably a harvest pond, i.e., a pond from which the crystal crop has been harvested. The kainite crystal crop exposed in at least one drained kainite pond is then covered with development brine which is concentrated with respect to potassium salts. As the temperatures of the brines decrease during the winter season they deposit additional crystal crops. Thus, the carnallite pond brine deposits additional carnallite, together with epsomite, in the carnallite ponds in which it is stored. The kainite pond brine deposits a crystal crop of schoenite, usually together with epsomite, in the harvest pond in which it is stored. The development brine which covers the kainite crystal crop deposits a comparatively low-grade crystal crop of potassium salts, i.e., a crystal crop containing some schoenite, but predominating in epsomite. During this period, brine in the carnallite ponds varies in composition depending upon the composition of the brine introduced to the ponds during the evaporation season and the temperature conditions prevailing during the particular winter in question. If the brine contains sufficiently low concentration of potassium for use as bitterns, it is withdrawn from the carnallite area and is transferred to bitterns storage. If the potassium concentration of the brine is too high for this use, it is transferred to a storage pond and held for use as a mixing brine during a subsequent evaporation season, unless the ratio of $K_2Cl_2$ to $MgCl_2$ in the brine is too high for use as a mixing brine; in that event, the brine is held in the carnallite ponds.

At the coldest part of the winter season, the kainite ponds are drained. The brines formed by precipitation dissolving the kainite crystal crops may be stored to be mixed with schoenite-concentrated brine at the beginning of the next evaporation season. The residual development brine is returned to ponds earlier in the flow sequence of the pond system. The volume of precipitation which collects in the drained ponds over the remainder of the winter season is relatively small and dissolves relatively little of the crystal crops. Moreover, the low temperature winter precipitation tends to selectively dissolve NaCl. The resulting brines may be periodically removed from the ponds, thereby preventing the accumulation of a large volume of brine susceptible to warming in the spring.

As a further embodiment of this invention, all of the kainite ponds may be drained and exposed to winter precipitation rather than being flooded with development brine. The winter precipitation dissolves a portion of the kainite crystal crop to form a brine. At the coldest part of the year, i.e., when the brines have a relatively low capacity for dissolved KCl but retain a high capacity for dissolved NaCl, these brines are removed and stored for use as a mixing brine during the next evaporation season.

The carnallite pond brine is rarely suitable for bitterns storage at this time of the year, being too diluted by winter precipitation. Thus, the carnallite pond brines may ordinarily be handled in the same fashion as are the kainite-precipitation brines, provided the ratio of potassium to magnesium is sufficiently low; otherwise, the carnallite brine is held in the carnallite ponds.

By draining the kainite and carnallite ponds and exposing the respective crystal crops to fresh water in the form of winter precipitation, the $MgCl_2$ concentration in the residual brine remaining in the crystal crops is reduced. As a result, substantial portions of the kainite and carnallite in the respective crystal crops are converted to schoenite. Schoenite is a more desirable feed material for a sodium sulfate plant than is either kainite or carnallite.

Just prior to the start of the next evaporation season, the pooled kainite pond brine is desirably distributed to the various kainite ponds in the brine circuit. According to the highly preferred embodiments, all of the crystal crops remaining in the carnallite ponds are dissolved in water and distributed to the kainite ponds in like manner together with any brines remaining in the carnallite ponds.

It is well understood by those skilled in the art that the specific minerals referred to by name herein and in the claims are discrete substances having characteristic X-ray diffraction patterns, physical properties, and chemcial compositions. Although it is recognized that individual ions are contained within a mineral crystal in spatial relationships dependent upon the structure of the mineral itself, it is nevertheless conventional to describe the chemical composition of a mineral as a combination of inorganic salts, often including crystal water. According to this practice, the minerals referred to herein and in the claims have chemical compositions as follows:

Kainite: $KCl \cdot MgCO_4 \cdot 2 \cdot 75H_2O$
Schoenite: $K_2SO_4 \cdot MgSO_4 \cdot 6H_2O$
Carnallite: $KCl \cdot MgCl_2 \cdot 6H_2O$
Bischofite: $MgCl_2 \cdot 6H_2O$
Epsomite: $MgSO_4 \cdot 7H_2O$

DESCRIPTION OF THE DRAWING

In the drawing, which illustrates what is presently contemplated as the best mode for carrying out the invention.

FIG. 1 is a flowsheet illustrating the summer sequence of brine manipulations in a solar pond system for the recovery of potassium salts from natural brine;

FIG. 2, a similar flowsheet illustrating the manipulation sequence at the end of the evaporation season;

FIG. 3, a flowsheet illustrating the manipulation sequence at the coldest part of the winter season; and FIG. 4, a flowsheet illustrating the manipulation sequence just prior to the next evaporation season.

DESCRIPTION OF THE ILLUSTRATED EMBODIMENTS

FIG. 1 illustrates the general flow sequence of brine in a solar pond system of the type disclosed and claimed by the parent application, Ser. No. 735,840, the disclosure of which is hereby incorporated by reference. Thus, raw brine containing dissolved sodium, potassium, magnesium, chloride, and sulfate, in proportions such that schoenite crystallizes from solution prior to kainite as the brine is concentrated, is evaporated in salt pond I until it is saturated or nearly saturated with respect to schoenite. The schoenite-concentrated brine is transferred to storage pond A. Schoenite-concentrated brine from storage pond A and brine from storage pond B are blended in appropriate ratios in a mixing pond to produce an adjusted brine feed for salt pond II.

Storage pond B may supply any compatible brine which has a lower weight ratio of dissolved potassium to dissolved magnesium than has the schoenite-concentrated brine. Usually, storage pond B contains brines recycled from ponds further advanced in the flow sequence of the solar pond system. The two brines are mixed in proportions such that when the resulting adjust brine is concentrated, the first potassium-containing salt to precipitate from solution is kainite. The adjusted brine is concentrated by evaporation in salt pond II until it is saturated or nearly saturated with respect to kainite. The brines of salt ponds I and II are termed "development brines." The kainite-concentrated development brine of salt pond II is then transferred to kainite ponds A, B, C, and D and subjected to further evaporative concentration, thereby dropping a high-grade kainite crystal crop, until it is saturated or nearly saturated with respect to carnallite.

Kainite pond E is illustrated as a harvest pond, i.e., one that receives no brine during this period to permit harvesting of its crystal crop. The carnallite-concentrated brine is then forwarded from kainite ponds A, B, C, and D to the carnallite ponds, wherein it is subjected to additional evaporation to produce a carnallite crystal crop.

The carnallite ponds are designated A1, A2 and A3 to indicate that they are each a part of one large, divided pond. Brine flows into carnallite pond A1, and passes successively through carnallite ponds A2 and A3, becoming progressively more concentrated. In this fashion, the portion of the carnallite crystal crop dropped in a given sub pond is segregated from the relatively more dense brine contained by a subsequent sub pond. As a result, less brine is lost due to entrainment in the crystal crop. Each major carnallite pond (A, etc.) in the system may have any desired number of sub ponds (A1, A2, and A3). In the illustrated instance, only one main carnallite pond is required. The kainite ponds are all illustrated as main ponds being operated in parallel with equivalent feed introduced to each pond. It should be understood that each of the kainite ponds will generally include a plurality of sub ponds in series in the same fashion as is illustrated for the carnallite pond.

At the end of the evaporation season, the carnallite ponds contain a carnallite crystal crop covered by carnallite-concentrated brine; the kainite ponds contain a kainite crystal crop covered by a kainite-concentrated brine; and salt pond II contains a NaCl crystal crop covered by a development brine unsaturated with respect to potassium at the temperatures prevailing during the evaporation season but containing a high concentration of dissolved potassium. The precise compositions of the crystal crops and brines will depend upon the initial composition of the raw brine feed to the solar pond system. The composition of the brine resulting from the evaporation of any particular brine feed may be defined by the concentration of $MgCl_2$ therein. The quantity and compositions of the crystal crops can be calculated from these brine compositions. For purposes of illustration, typical compositions of brines in a system receiving feed brine from the Great Salt Lake of Utah are reported in Table 1. Typical analyses of corresponding crystal crops are reported in Table 2.

TABLE 1.—TYPICAL COMPOSITIONS OF BRINE FEEDS AND RESULTING BRINES AT THE END OF AN EVAPORATING SEASON

| Description (Fig. 1) | Moles per 1,000 moles $H_2O$ | | | |
| --- | --- | --- | --- | --- |
|  | $Na_2Cl_2$ | $K_2Cl_2$ | $MgSO_4$ | $MgCl_2$ |
| Brine feed (range) | 43 (40–46) | 2.1 (1.8–2.5) | 5.8 (4.5–6) | 6.3 (6–7) |
| Salt pond II | 15.2 | 6.7 | 17 | 39 |
| Kainite ponds | 9 | 7.7 | 18.5 | 47 |
| Carnallite ponds [1] | 5 | 5.4 | 12 | 63 |

[1] Combined A1, A2, and A3.

TABLE 2.—TYPICAL ANALYSES OF CRYSTAL CROPS DEPOSITED DURING THE EVAPORATION SEASON FROM THE SPECIFIC BRINES REPORTED IN TABLE 1

| Description (Fig. 1) | Weight percent (oven dry basis) [1] | | | | |
| --- | --- | --- | --- | --- | --- |
|  | $SO_4$ | Mg | K | Na | Cl |
| Salt pond II | 14.7 | 3.0 | 2.3 | 31.5 | 48.5 |
| Kainite ponds | 39.8 | 10.1 | 12.3 | 10.5 | 27.3 |
| Carnallite ponds [2] | 19.5 | 13.4 | 13.6 | 6.4 | 47.1 |

[1] See Table 4 for a corresponding analysis of the kainite crystal crop including brine entrainment.
[2] Combined A1, A2, and A3.

Referring to FIG. 2, at the close of the evaporation season, flow of feed brine into salt pond I is stopped. The kainite-concentrated brine is transferred from kainite ponds A, B, C and D to the previously harvested kainite pond E. Brine from salt pond II and, if desired, salt pond I, is drained into kainite pond A. The brines from carnallite ponds A1 and A2 are transferred to carnallite pond A3. The pooled carnallite brine is withdrawn for transfer to either bitterns storage or storage pond B, as permitted by the composition of the brine. The concentration of the brine will decrease as a result of winter precipitation and the ratio of potassium to magnesium in the brine will fluctuate under the influence of cooling, warming, dilution, and other factors. In general, brine containing less than about 1 mole of $K_2Cl_2$ per 1,000 moles $H_2O$ can be sent to bitterns storage. Brine containing more than 1 mole of $K_2Cl_2$ per 1,000 moles $H_2O$ may be transferred to storage pond B, but it is normally retained if it contains a higher ratio of $K_2Cl_2$ to $MgCl_2$, typically about 0.05, than does the normal summer feed brine to the carnallite ponds.

Preferably, the aforedescribed brine manipulations result, as in the illustrated instance, in a reduction of the total surface area of each type of brine in the pond system. In this fashion, the brines are subjected to winter cooling while undergoing a minimum of dilution by winter precipitation.

While a relatively low grade, potassium-containing crystal crop is dropped on the kainite crystal crop in kainite pond A under the influence of winter cooling, the kainite crystal crops in kainite ponds B, C, and D are exposed to precipitation. Eventually a pool of cold fresh water accumulates in contact with the crystal crops in these ponds. Because of the low temperature of the water, a smaller proportion of potassium salts is leached from the crystal crop than would be the case if the water were at a higher temperature, such as prevails in the spring of the year. The concentration of $MgCl_2$ in the brine entrained in the crystal crop is reduced as $MgCl_2$ diffuses into the accumulated pool of precipitation. As a result, a portion of the kainite is converted to schoenite.

Figures 3, 4:
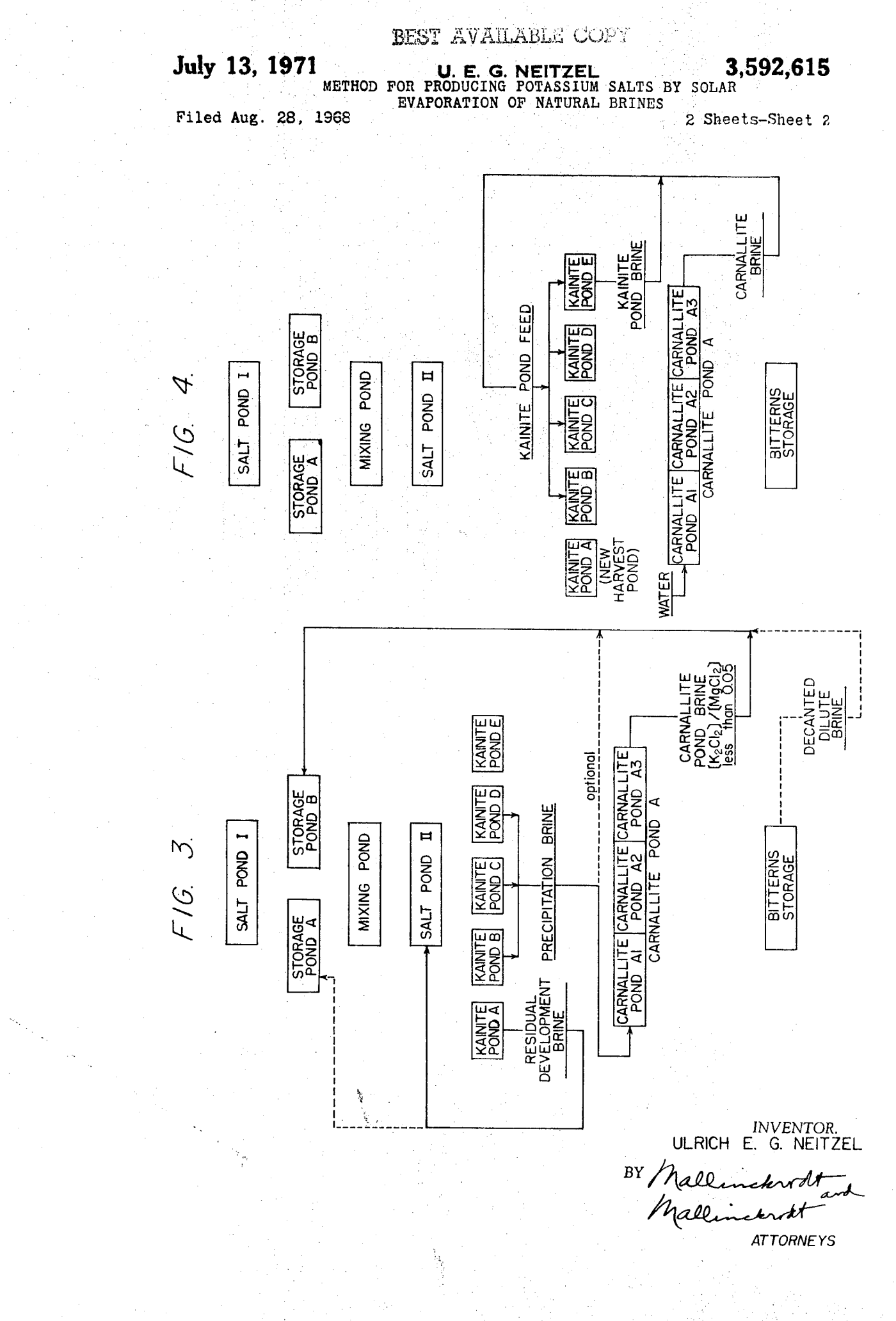

At the coldest part of the year, the brines are manipulated as illustrated by FIG. 3. Thus, the residual brine resulting from winter cooling of the development brine in kainite pond A is returned to salt pond II and/or salt pond I, depending upon its composition. The precipitation brines formed in kainite ponds B, C, and D, are pumped to storage pond B. Although these brines may be pumped directly to storage pond B, it is usually preferred to pump them through the carnallite ponds as illustrated, to displace the remaining carnallite brine and to dissolve a portion of the carnallite crystal crop. A dilute brine layer often forms on top of the bitterns brine during the winter and may be decanted and sent to storage pond B. The resulting composite brine in storage pond B contains a much lower ratio of potassium to magnesium than does the normal effluent from salt pond I. Accordingly, it is suitable for use as a mixing brine at the beginning of the next evaporation season.

Table 3 reports typical composition ranges of the brines in the system at the coldest part of the year as well as a typical composition for each brine.

TABLE 3.—TYPICAL COMPOSITIONS OF RESIDUAL BRINES AT THE COLDEST PART OF THE YEAR (0° C.)

| Description (Fig. 3) | Moles per 1,000 moles $H_2O$ | | | |
| --- | --- | --- | --- | --- |
|  | $Na_2Cl_2$ | $K_2Cl_2$ | $MgSO_4$ | $MgCl_2$ |
| Kainite pond A [1] | 16 (9–20) | 6.8 (6–7) | 13 (10–15) | 35 (20–45) |
| Kainite ponds B, C, and D [1] | 8 (7–9) | 6 (6–7) | 9 (8–21) | 55 (45–65) |
| Carnallite pond [1] | 3 (2.5–4) | 2.4 (2–4) | 7 (6–10) | 70 (65–75) |
| Bitterns storage pond [1] | 2 (1–3) | 1 (0.5–1.5) | 6 (5–8) | 80 (75–90) |

[1] Range.

Winter cooling results in the deposition of valuable constituents for feed to a potassium sulfate plant. Thus, winter cooling of the development brine results in the deposition of a crystal crop containing about 30 to about 70 percent by weight schoenite, the remainder being essentially all epsomite. Cooling of carnallite pond brine results in the deposition of a crystal crop containing about 35 to about 65 percent by weight carnallite, the remainder being essentially all epsomite. The kainite pond brine is retained in kainite pond E so that none of the potassium value of this brine is lost during the winter.

Precipitation accumulating in the carnallite ponds and kainite ponds during the remainder of the non-evaporation season leaches additional salts from the crystal crops and extracts additional $MgCl_2$ from the brine entrained in the crystal crops. By periodically draining the precipitation brines from the ponds during cold periods, when the solubility of potassium salts is low, the potassium content of the crystal crops is conserved. As the concentration of $MgCl_2$ in the entrained brines is reduced, some of the carnallite and kainite are converted to schoenite. This conversion results in enhancement of the crystal crops in terms of grade appreciation. The precipitation brines are of suitable composition to be transferred to storage pond B for use as a mixing brine.

Table 4 compares the analysis of a typical crystal crop remaining in kainite ponds, such as kainite ponds B, C or D, at the close of an evaporation season with the corresponding analysis of the same crystal crop after being exposed to winter precipitation in accordance with this invention.

TABLE 4.—TYPICAL ANALYSES OF KAINITE POND CRYSTAL CROPS (INCLUDING NORMAL BRINE ENTRAINMENT)

|  | Percent by weight (oven dry basis) |  |  |  |  |  |
| --- | --- | --- | --- | --- | --- | --- |
|  | $SO_4$ | Mg | K | Na | Cl | $H_2O$ |
| At close of evaporation season | 22.1 | 7.3 | 6.9 | 5.8 | 20.2 | 37.7 |
| At close of non-evaporation season | 30.6 | 6.4 | 10.5 | 6.9 | 16.0 | 29.4 |

At any time after the coldest part of the year, water may be introduced to the carnallite ponds as illustrated by FIG. 4 to dissolve the entire crystal crop remaining therein. The term "water" is intended to include any aqueous solvent, such as dilute brines. The minimum amount of water required for this purpose is normally used, it being generally more desirable to obtain a concentrated brine than to remove all of the solids from the pond.

The typical range of brine compositions resulting from the dissolution of the carnallite crystal crops and the composition of a specific brine within the range are reported in Table 5.

TABLE 5.—TYPICAL COMPOSITIONS OF CARNALLITE BRINES

|  | $MgSO_4$ | $MgCl_2$ | $K_2Cl_2$ | $Na_2Cl_2$ |
| --- | --- | --- | --- | --- |
| Range | 14–18 | 40–55 | 7–9 | 5.5–8 |
| Example | 16.7 | 45 | 8.4 | 6.6 |

Just prior to the start of the next evaporation season, the brine from the carnallite ponds is distributed as shown to kainite ponds B, C, D, and E. Kainite pond A is now kept out of the brine flow system so that its crystal crop may be harvested. The brine pooled in kainite pond E throughout the non-evaporation season is also distributed to kainite ponds B, C, D and E so that each kainite pond in the system starts the evaporation season with substantially similar brines.

Although the invention has been described with reference to details of certain specific embodiments, it is not intended to thereby limit the scope of the invention except to the extent these details are included in the appended claims. Many modifications within the legitimate scope of the claims will be suggested to those skilled in the art by the present disclosure. For example, it is recognized that the procedures outlined in the claims will conserve commercial values in, and appreciate the grade of, crystal crops of markedly different compositions than those specifically disclosed herein. Moreover, the flow sequences disclosed for use during the evaporation and non-evaporation seasons may be followed to advantage for the recovery of commercially valuable salts from raw brines of widely varying compositions.

I claim:
1. A method for producing potassium salts which comprises:
    collecting brine saturated with respect to kainite

$$(KCl \cdot MgSO_4 \cdot 2.75H_2O)$$

and containing dissolved $MgCl_2$ in an outdoor solar pond;
    subjecting said kainite-saturated brine to evaporation during the evaporation season to produce a high-grade kainite crystal crop;
    draining said pond, leaving in place said kainite crystal crop and brine entrained in said crystal crop;
    flooding said pond during the non-evaporation season with brine containing a lower concentration of $MgCl_2$ than said kainite-saturated brine and concentrated with respect to both NaCl and potassium salts;
    subjecting said brine of lower $MgCl_2$ concentration to cooling while it is in said pond thereby resulting in the deposition of a crystal crop containing potassium salts on top of said kainite crystal crop; and
    draining the pond during a period of low temperature to expose the combined crystal crop and entrained brine to precipitation.

2. The method of claim 1, wherein the said brine containing a lower concentration of $MgCl_2$ than the said kainite-saturated brine is development brine resulting from evaporating a mixture of schoenite-concentrated brine with brine containing a lower ratio of potassium to magnesium than said schoenite-concentrated brine.

3. The method of claim 1, wherein low-temperature precipitation is collected in said pond thereby to selectively dissolve NaCl from the crystal crop in said pond to form a precipitation brine and a crystal crop of increased grade with respect to potassium; and said precipitation brine is removed from said pond during a period of low-temperature.

4. The method of claim 3, wherein all of the named brines are derived from brine taken from the Great Salt Lake of Utah.

5. In an outdoor solar evaporation process, wherein brine flows, in turn, through a salt pond, a kainite pond, a carnallite pond, and a bitterns pond such that at the end of the evaporation season the kainite pond contains a kainite crystal crop covered by a kainite pond brine intermediate in composition between the normal feed and effluent brines of said kainite pond, the carnallite pond contains a carnallite crystal crop covered by a carnallite pond brine intermediate in composition between the normal feed and effluent brines of said carnallite pond, and the salt pond contains a development brine concentrated with respect to potassium salts, the improvement which comprises:
    draining said kainite pond at the end of the evaporation season, leaving in said pond said kainite crystal crop;
    exposing said kainite crystal crop to winter precipitation;
    pooling winter precipitation in said pond in contact with said kainite crystal crop so that NaCl is selectively dissolved thereby forming a precipitation brine; and
    withdrawing said precipitation brine from said pond while said brine is cold.

6. The improvement of claim 5, wherein the kainite pond brine from a plurality of kainite ponds is pooled in a single pond during the non-evaporation season thereby reducing the total surface area of said brine which is exposed to winter precipitation.

7. The improvement of claim 6, wherein just prior to the next evaporation season, the pooled kainite pond brine is redistributed to the kainite ponds in the solar pond system.

8. The improvement of claim 5, wherein
a kainite pond is drained near the end of the evaporation season;
the kainite crystal crop therein is covered by said development brine during the non-evaporation season;
the development brine is subjected to cooling, while it is in contact with said kainite crystal crop, sufficient to result in the deposition of a crystall crop including potassium salts on top of said kainite crystal crop; and
the development brine is withdrawn from the said kainite pond while cold.

9. The improvement of claim 8, wherein the development brine withdrawn from the kainite pond is transferred to the salt pond.

10. The improvement of claim 8, wherein
the development brine is withdrawn from said kainite pond during the winter season;
the crystal crop in said pond is thereafter exposed to winter precipitation;
winter precipitation is pooled in contact with said crystal crop to selectively dissolve NaCl thereby forming a precipitation brine; and
said precipitation brine is withdrawn from said kainite pond while cold.

11. The improvement of claim 10, wherein all of the precipitation brines withdrawn from the kainite ponds are stored for recycle through the solar pond system during a subsequent evaporation season.

12. The improvement of claim 11, wherein winter precipitation is collected on top of the bitterns brine contained in the bitterns pond, thereby forming a precipitation brine, and said precipitation brine is decanted and stored with the precipitation brines of claim 11 for recycle through the solar pond system.

13. The improvement of claim 5, wherein after the precipitation brine is withdrawn from the kainite pond
a concentrated brine is prepared by dissolving the carnallite crystal crop in water; and
said concentrated carnallite brine is introduced to said kainite pond.

14. The improvement of claim 13, wherein the pond system includes a plurality of kainite ponds and the concentrated carnallite brine is distributed to said plurality of kainite ponds near the start of the evaporation season next succeeding said non-evaporation season.

15. The improvement of claim 14, wherein the kainite pond brine from a plurality of kainite ponds is pooled and stored during the winter and is redistributed in the same fashion as is said concentrated carnallite brine.

References Cited

UNITED STATES PATENTS

| | | | |
|---|---|---|---|
| 681,407 | 8/1901 | Coward | 159—1 |
| 1,156,388 | 10/1915 | Bradburn | 23—298 |
| 1,286,932 | 12/1918 | Burnham | 23—298 |
| 1,353,283 | 9/1920 | Silsbee | 23—297 |
| 1,417,139 | 5/1922 | Burnham | 23—298 |
| 1,432,796 | 10/1922 | Silsbee | 23—297 |
| 1,593,038 | 7/1926 | Silsbee | 23—298 |
| 1,863,751 | 6/1932 | Kipper | 23—297 |
| 3,099,528 | 7/1963 | Hadzeriga | 23—38 |
| 3,243,259 | 3/1966 | Stein et al. | 23—38 |
| 3,432,031 | 3/1969 | Ferris | 23—121 |

FOREIGN PATENTS

| | | |
|---|---|---|
| 67,461 | 12/1959 | India. |

WILBUR L. BASCOMB, JR., Primary Examiner

U.S. Cl. X.R.

23—38, 121 298, 302, 304, 312AH; 159—1S

PO-1050
(5/69)

UNITED STATES PATENT OFFICE
CERTIFICATE OF CORRECTION

Patent No. 3,592,615                Dated July 13, 1971

Inventor(s) Ulrich E. G. Neitzel

It is certified that error appears in the above-identified patent and that said Letters Patent are hereby corrected as shown below:

Col. 1, line 39, change "pounds" to ---ponds---;

Col. 4, line 14, change "chemcial" to ---chemical---;

Col. 4, line 23, change "$KCl \cdot MgCO_4 \cdot 2.75H_2O$" to ---$KCl \cdot MgSO_4 \cdot 2.75H_2O$-

Col 4, line 65, change "adjust" to ---adjusted---;

Table 3, line 6, change "9(8=21)" to ---9(8-12)---.

Signed and sealed this 28th day of December 1971.

(SEAL)
Attest:

EDWARD M. FLETCHER, JR.       ROBERT GOTTSCHALK
Attesting Officer              Acting Commissioner of Patents